United States Patent [19]

Leblanc et al.

[11] Patent Number: 5,754,284

[45] Date of Patent: May 19, 1998

[54] OPTICAL TIME DOMAIN REFLECTOMETER WITH INTERNAL REFERENCE REFLECTOR

[75] Inventors: Michel Leblanc, Québec; Robert Larose, Ste-Foy; Robert Tremblay, St-Augustin, all of Canada

[73] Assignee: EXFO Electro-optical Engineering Inc., Vanier, Canada

[21] Appl. No.: 728,032

[22] Filed: Oct. 9, 1996

[51] Int. Cl.⁶ ............................................. G01N 21/88
[52] U.S. Cl. ............................................. 356/73.1
[58] Field of Search ............................................. 356/73.1

[56] References Cited

U.S. PATENT DOCUMENTS

| | | | |
|---|---|---|---|
| 4,904,864 | 2/1990 | Dakin et al. | 356/73.1 X |
| 5,062,704 | 11/1991 | Bateman | 356/73.1 |
| 5,251,001 | 10/1993 | Dave et al. | 356/73.1 |
| 5,408,310 | 4/1995 | Furuhashi et al. | 356/73.1 |
| 5,452,071 | 9/1995 | Takeuchi | 356/73.1 |
| 5,465,143 | 11/1995 | Chu et al. | 356/73.1 |

FOREIGN PATENT DOCUMENTS 2 190 264  11/1987  United Kingdom.

*Primary Examiner*—Vincent P. McGraw
*Attorney, Agent, or Firm*—Thomas Adams

[57] ABSTRACT

An optical time domain reflectometer suitable for determining its front panel insertion loss comprises a four-port coupler having first and second ports connected to a light source and an optical detector, respectively, and third and fourth ports connected to a front panel connector and a reference reflector, respectively. In use, a fiber-under-test is connected to the front panel connector. The coupler splits light from the light source between the front panel connector and the reference reflector and couples light returning from the front panel connector and reflector to the detector. The optical path between the front panel connector and the coupler is longer than the optical path between the reference reflector and the coupler by such a distance that a Fresnel reflection pulse from the reference reflector, produced by a pulse emitted by the light source, will be received by the detector before a corresponding reflection pulse returned from the front panel connector. In order to ensure that the two reflection pulses can be distinguished from each other, the difference between the two optical paths is greater than a distance equal to an event dead zone for the particular width of pulse supplied by said light source. The reference reflector comprises an end portion of a length of optical fiber, preferably encapsulated with a material having a refractive index different from that of the length of optical fiber. The OTDR facilitates miniaturization because it avoids the use of an internal length of reference fiber.

8 Claims, 2 Drawing Sheets

OPTICAL TIME DOMAIN REFLECTOMETER WITH INTERNAL REFERENCE REFLECTOR

TECHNICAL FIELD

This invention relates to optical time domain reflectometers such as are used to test optical transmission paths for discontinuities and to measure losses.

BACKGROUND ART

Typically, such an optical time domain reflectometer (OTDR) is coupled to the optical transmission path, such as an optical fiber, and transmits optical pulses from a light source, usually a laser, onto the fiber. Light returning to the receiver includes return pulses caused by Fresnel reflection at discontinuities, especially the front panel connector to which the fiber-under-test is connected, and backscatter due primarily to Rayleigh scattering in the fiber-under-test. For a given optical pulse duration, the actual amplitude of the backscatter is dependent upon both the OTDR internal circuitry (transmitter power and receiver gain) and the front panel insertion loss. Although most internal components can be calibrated at the factory, some variations occur during use. For example, the output power of the transmitter and the gain of the receiver may change over a period of time or may be affected by temperature change. Also, the front panel insertion loss may change whenever a new fiber is connected for testing, because slight misalignment may occur or the front panel connector may become contaminated. This will change the coupling of light from the light source to the fiber-under-test, and from the fiber-under-test to the receiver, resulting in changes in the signal levels and backscatter amplitude. Because backscatter level can be affected by more than one cause, additional information is needed in order to be able to monitor front panel insertion loss and OTDR internal circuitry drift unambiguously.

U.S. Pat. No. 5,062,704 (Bateman), issued Nov. 5, 1991, discloses an OTDR capable of compensating for loss due to the connection between the front panel connector and the fiber-under-test. This OTDR comprises an optical transmitter coupled to one port of an optical coupler. A reference optical fiber is connected between a first output port of the coupler and a front panel connector, and hence in series with a fiber-under-test connected to the front panel connector. An optical detector connected to a third port of the optical coupler detects backscattered light from both the reference fiber and the fiber-under-test. The coupler is a Bragg cell which switches between a transmit state, in which it couples light from the source to the fiber-under-test while blocking light from reaching the detector, and a receive state in which it couples light from the fiber-under-test to the detector while blocking light from reaching the transmitter. The delay due to the switching of the Bragg cell prevents high reflections from the fiber-under-test overdriving the detector and obscuring any variations occurring during the decaying portion of the detector response. The delay caused by the reference fiber compensates for the Bragg cell switching delay and ensures that the early part of the trace is not masked.

Backscattered light from the reference fiber is used to establish a reference level which is compared to the backscattered light from the fiber-under-test to determine the loss associated with the front panel connector and detect any faulty connection to the fiber-under-test. The reference level may also be used during self-diagnosis. Each time the OTDR is turned on, self-diagnostic tests measure the backscatter and compare the results with initial factory data.

This OTDR is not entirely satisfactory, however, because the reference fiber must have a minimum length longer than the attenuation dead zone for the selected pulse width, in order to ensure that the trace has Rayleigh backscatter portions before and after the front panel reflection pulse, thus enabling the comparison to be made. Typically, the reference fiber is 100 meters long, or more, which makes miniaturisation of the OTDR difficult. Moreover, highly-reflective components within the OTDR, such as some types of splitter, or the source and detector themselves, may reflect some of the received light, causing multiple reflections between the splitter and the front panel connector, resulting in distortion in the trace measured by the OTDR. This effect, which may occur when testing strongly reflective network components, is exacerbated when the optical path between the OTDR internal components and the front panel connector is relatively long.

U.S. Pat. No. 5,408,310 (Furuhashi et al) also discloses an OTDR with a reference fiber between the source and the front panel connector. In this case, the reference fiber is used as a delay to ensure that "cross-talk" light between the ports of the coupler is separated from reflections from the front panel reflector, thereby reducing saturation and enabling a shorter dead zone to be used. Although its purpose is different, the delay fiber is of a similar length to that disclosed in U.S. Pat. No. 5,062,704 and would result in the same problems.

SUMMARY OF THE INVENTION

The present invention seeks to ameliorate these problems and provide an improved OTDR which is capable of tracking OTDR circuitry drift and evaluating front panel connector insertion loss while facilitating size reduction as compared with these known OTDR devices.

According to the present invention, an optical time domain reflectometer comprises a coupler having first, second, third and fourth ports, a light source and an optical detector connected to the first and second ports, respectively, and an output connector and a reference reflector connected to the third and fourth ports, respectively, the output connector serving for connection to an optical fiber to be measured, the coupler being arranged to couple light from the light source to both the connector and the reference reflector and to couple light returning from the connector and reference reflector to the optical detector, the optical path between the connector and the coupler being longer than the optical path between the reference reflector and the coupler, such that a reference reflection pulse from the reference reflector produced by a pulse emitted by the light source will be received by the optical detector before a corresponding connector reflection pulse returned from the connector.

Preferably, the optical path between the coupler and the connector is longer than the optical path between the coupler and the reference reflector by at least a distance equal to an event dead zone for the particular width of pulse supplied by said light source. As used in this specification, "event dead zone distance" is the width of the pulse at an amplitude which is −1.5 dB below the peak amplitude of the pulse.

The reference reflector may comprise an end portion of a relatively length of optical fiber terminated to provide a suitable Fresnel reflection. The end portion may be encapsulated in a material having a refractive index different from the refractive index of the length of optical fiber and selected so that the amplitude of the reference reflection pulse will be roughly comparable to the amplitude of that from the connector.

According to a second aspect of the invention, there is provided a method of monitoring for variations in parameters of components of an optical time domain reflectometer according to the first aspect of the invention comprises the steps of establishing an initial calibration reflection pulse amplitude (A') by supplying light pulses to the reference reflector and storing such initial calibration reflection pulse amplitude in a memory of the processor; subsequently, during normal usage, supplying pulses to the reflector from the light source, determining the amplitude (A) of a reflection pulse resulting therefrom; comparing said amplitude (A) of the resulting pulse with the stored initial calibration reflection pulse amplitude (A'); determining any differences ($\Delta_{OTDR}$) therebetween; and compensating for such differences during subsequent measurements by the apparatus.

Such subsequent measurements may include a measurement of connector insertion loss, in which case the method would include the steps of;

during an initial calibration, establishing an initial calibration reflection pulse amplitude (A') by supplying light pulses to the reference reflector and storing such initial calibration reflection pulse amplitude (A') in a memory of the processor; establishing an initial calibration launch level (C') by extrapolating to a zero ordinate a substantially linear tail portion of a backscatter trace obtained with a reference optical fiber connected to the output connector and storing the initial calibration launch level (C'); subsequently, during normal usage;

supplying pulses from the light source to the reference reflector and determining the amplitude of a subsequent reflector pulse (A), and determining any difference ($\Delta_{OTDR}$) between the initial calibration pulse amplitude (A') and the subsequent reflector pulse amplitude (A);

with a fiber-under-test connected to the output connector, supplying pulses from the light source to produce a further backscatter trace;

extrapolating a substantially linear tail portion of said further backscatter trace for the fiber-under-test to the zero ordinate to establish a measured launch level (C);

establishing an expected launch level (C") as the initial calibration launch level (C') plus or minus, as appropriate, said difference ($\Delta_{OTDR}$) between the initial calibration reflection pulse amplitude (A') and the resulting reflection pulse amplitude (A); and determining the insertion loss as the difference between the expected launch level (C") and the measured launch level (C).

Various features and advantages of the invention will become apparent from the following description of a preferred embodiment which is described by way of example only with reference to the accompanying drawings.

DESCRIPTION OF THE PREFERRED EMBODIMENT

Figure 1:
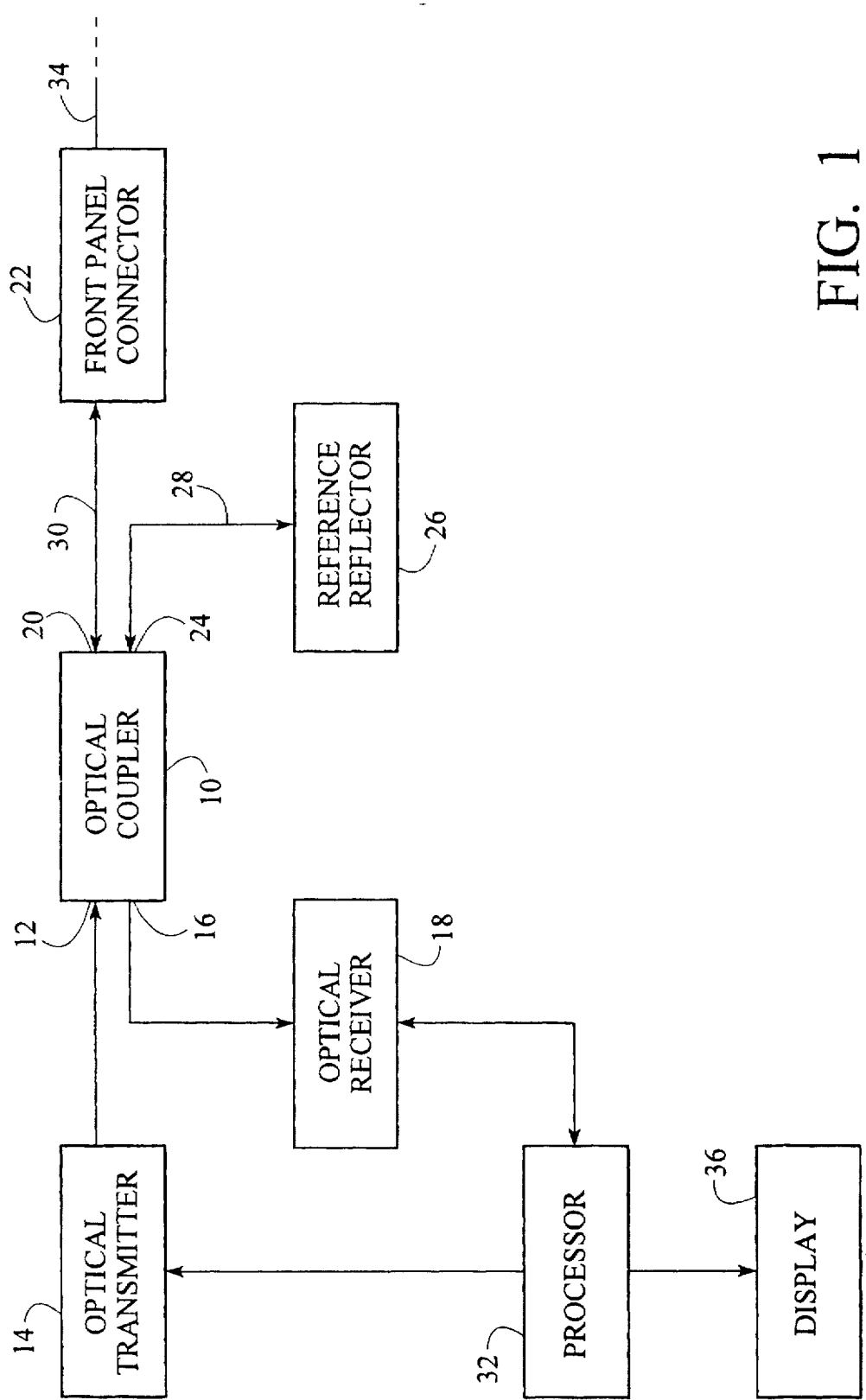
FIG. 1 is a simplified schematic block diagram of an optical time domain reflectometer (OTDR) embodying the present invention.

The optical time domain reflectometer depicted in FIG. 1 comprises a beamsplitting optical coupler 10 having a first port 12 connected to the output of an optical transmitter 14, a second port 16 connected to the input of an optical receiver 18, a third port 20 connected to a front panel connector 22 and a fourth port 24 connected to a reference reflector 26. The coupler 10 splits light from transmitter 14 equally between the third and fourth ports and couples light returned via the third and fourth ports to the receiver 18. The optical transmitter 14 may comprise a laser light source and the optical receiver 18 may comprise a photodetector, such as an avalanche photodiode, and an amplifier. The reference reflector 26 comprises the end of a short, unterminated single-mode or multi-mode optical fiber "pigtail" 28, suitably prepared to produce a proper Fresnel reflection. More particularly, the reference reflector 26 is produced by encapsulating the cleaved end of the pigtail fiber 28 with a material having a refractive index different from that of the pigtail fiber 28 and chosen so as to adjust the Fresnel reflection from the end 26 of the pigtail fiber 28 so that it is comparable in magnitude with the expected typical reflection from the front panel connector 22. Moreover, its reflectance should be stable with respect to temperature and time. Typically, a reflection of about −40 dB, has been found to be satisfactory. A slight difference is not required. They could be equal, or differ significantly. Front panel reflectance could vary considerably depending upon connection quality or connector type.

Figure 2:
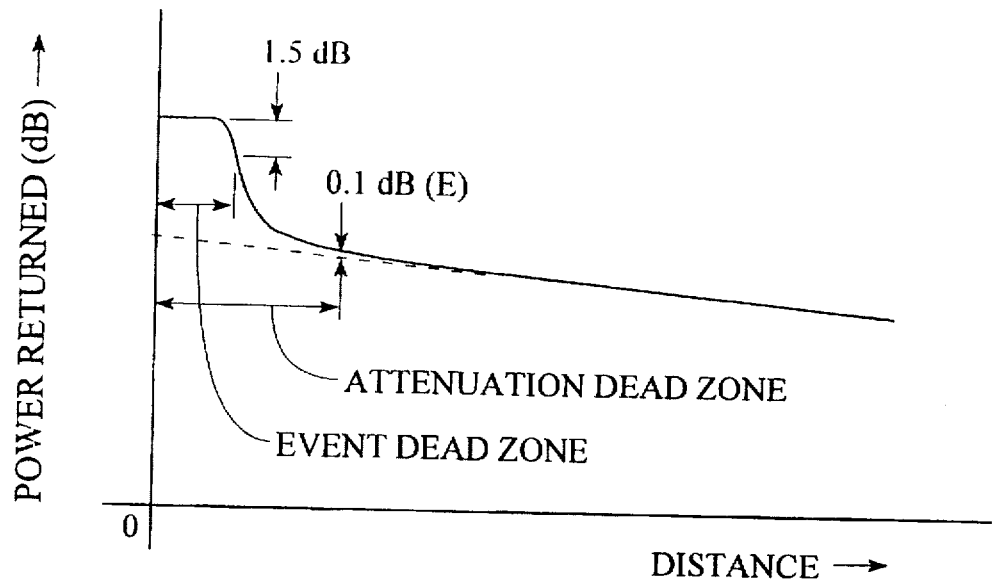
FIG. 2 depicts parameters of pulses used by the OTDR.

The optical path 30 between the third port 20 of coupler 10 and the front panel connector 22 is longer than the optical path between the fourth port 24 of coupler 10 and the reference reflector 26 by at least the "event dead zone" of the OTDR, but may be shorter than the "attenuation dead zone". These dead zones are defined in Bellcore standard No. TR-TSY-000196, Issue 2, September 1989. As illustrated in FIG. 2, the event dead zone is equal to the width of the received pulse, for the front panel Fresnel peak, at an amplitude 1.5 dB, below its peak amplitude. By contrast, the "attenuation dead zone" is the width of the pulse, near its base, where it departs from a linear trace by more than a prescribed amount $\epsilon$. According to practice in the industry, the prescribed amount $\epsilon$ is usually 0.5 dB, though sometimes a value of $\epsilon$ of 0.1 dB is used. Typically, for a 10 nanosecond pulse and using a high bandwidth receiver, the event dead zone might be 5 meters and the attenuation dead zone 25 meters, in which case the lead-in fiber 30 between the coupler 10 and the front panel connector 22 might be about 10 meters long. The pigtail 28 is much shorter than 10 meters, perhaps about 20 cms., so as to ensure that receiver 18 will receive the reflected pulse from the reference reflector 26 before the reflected pulse from the front panel connector 22, preferably with as much separation as possible. (By way of comparison, for a 1 microsecond pulse, the event dead zone might be about 105 meters and the attenuation dead zone about 120 meters).

The optical transmitter 14 is controlled by a microprocessor 32 which also receives signals from, and controls, the receiver 18. The transmitter 14 transmits light pulses via the third port 20 of the coupler 10 to a fiber-under-test 34 coupled to the panel connector 22 and, via the fourth port 24 of the coupler 10, to the reference reflector 26. The optical receiver 18 amplifies and samples light received via third port 16 which comprises both backscattered light returned from the fiber-under-test 34 via port 16 of the optical coupler 10 and light returned from the reference reflector 26 via ports 24 and 16. The processor 32 analyses the received and sampled signals and controls a display 36 to display traces representing the light received by the receiver 18.

Figure 3:
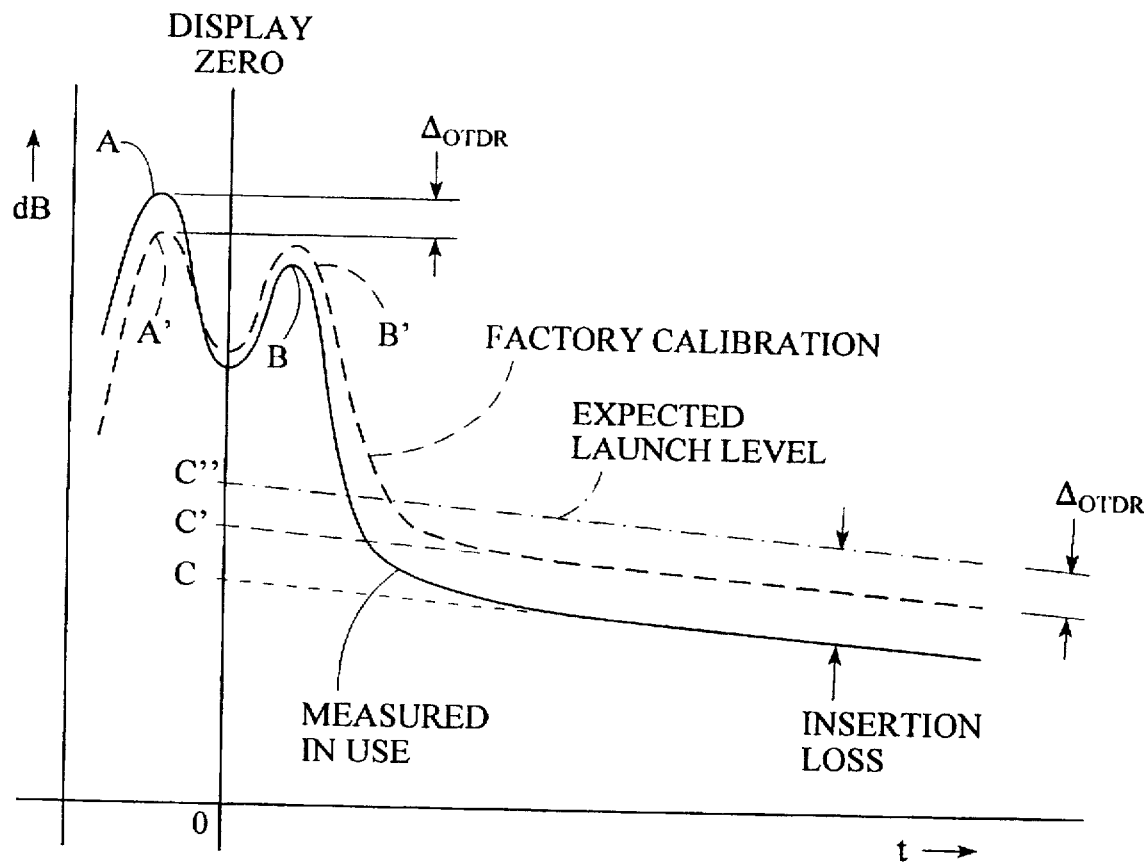
FIG. 3 illustrates a trace produced by the OTDR of FIG. 1 from light returned by a transmission path under test.

An example of such a trace is shown as a full line in FIG. 3. In practice, during normal measurements upon a fiber under test, the user would see only that portion of the trace after the origin or zero ordinate marked "O". For calibration purposes, however, the complete trace would be viewed. The two peaks labelled "A" and "B" are the Fresnel reflection pulses from the reference reflector 26 and from the front panel connector 22, respectively. Peak A occurs before peak B because of the difference in length of the optical paths, as described above. Shown as a broken line in FIG. 3 is a corresponding trace obtained during factory calibration of the OTDR, with corresponding peaks A' and B', respectively. Although the OTDR will usually be capable of using longer duration pulses, it is desirable to use the shortest pulse for factory calibration and subsequent insertion loss measurements.

During factory calibration, a relatively long length of optical fiber is connected in place of a fiber-under-test using a good, clean connection and short pulses, e.g. 10 nanoseconds, applied to it. The height of the reference peak A' is measured and stored in the memory of processor 28 for subsequent use. In addition, the linear portion of the trace is extrapolated back to the zero ordinate O to establish a factory calibrated or "primary" launch level C', which also is stored in the memory.

Each time the OTDR is used, the current height of peak A is measured and the processor 32 compares it with the factory calibrated reference level A'. If the transmitter or receiver characteristics have varied with time and/or temperature, the heights of peak A and peak A' will differ by the amount shown as $\Delta_{OTDR}$ in FIG. 3. This difference $\Delta_{OTDR}$ is taken into account when determining the insertion loss of the front panel connector 22 and, subsequently, testing the fiber-under-test 34. The same values will be used regardless of the pulse width used for the particular tests though, as mentioned previously, the factory calibration and insertion loss measurements will be made using the shortest pulse width.

When measuring the front panel connector insertion loss, for example, the linear portion of the tail is extrapolated back to the display zero ordinate "O" to establish a measurement launch level C. The factory calibrated launch level C' is adjusted by the amount $\Delta_{OTDR}$ (in the example in FIG. 3 by adding it) to obtain an "expected" launch level C". The front panel connector insertion loss is then the difference between the expected launch level C" and the measurement launch level C.

An advantage of OTDRs embodying the present invention is that the use of a reference reflection which is not in series with the front panel connector allows the receiver gain to be adjusted, perhaps automatically, without any fiber connected to the front panel connector, avoiding uncertainty between the front panel insertion loss and OTDR circuitry effects. Moreover, the absence of a reference optical fiber between the coupler and the front panel means that the optical path can be relatively short, even shorter than the attenuation dead zone, and tends to reduce the effect of multiple reflectances.

What is claimed is:

1. An optical time domain reflectometer comprising a coupler having first, second, third and fourth ports, a light source and an optical detector connected to the first and second ports, respectively, and an output connector and a reference reflector connected to the third and fourth ports, respectively, the connector serving for connection to an optical fiber to be measured, the coupler being arranged to couple light from the light source to both the connector and the reference reflector and to couple light returning from the connector and reflector, respectively, to the optical detector, the optical path between the output connector and the coupler being longer than the optical path between the reference reflector and the coupler, such that a reference reflection pulse from the reference reflector produced by a pulse emitted by the light source will be received by the optical detector before a corresponding connector reflection pulse returned from the output connector.

2. An optical time domain reflectometer as claimed in claim 1, wherein the optical path between the coupler and the output connector is longer than the optical path between the coupler and the reference reflector by at least a distance equal to an event dead zone given a particular width of pulse supplied by said light source.

3. An optical time domain reflectometer as claimed in claim 1, wherein the reference reflector comprises an end portion of a length of optical fiber.

4. An optical time domain reflectometer as claimed in claim 2, wherein the reference reflector comprises an end portion of a length of optical fiber.

5. An optical time domain reflectometer as claimed in claim 1, wherein the reference reflector comprises an end portion of a length of optical fiber, said end portion being encapsulated in a material having a refractive index different from a refractive index of said length of optical fiber.

6. An optical time domain reflectometer as claimed in claim 2, wherein the reference reflector comprises an end portion of a length of optical fiber, said end portion being encapsulated in a material having a refractive index different from a refractive index of said length of optical fiber.

7. A method of monitoring for variations in parameters of components of an optical time domain reflectometer comprising a coupler having first, second, third and fourth ports, a light source and an optical detector connected to the first and second ports, respectively, and an output connector and a reference reflector connected to the third and fourth ports, respectively, the output connector serving for connection to an optical fiber to be measured, the coupler being arranged to couple light from the light source to both the output connector and the reference reflector and to couple light returning from the output connector and reference reflector to the optical detector, the optical path between the output connector and the coupler being longer than the optical path between the reference reflector and the coupler, such that a reference reflection pulse from the reference reflector produced by a pulse emitted by the light source will be received by the optical detector before a corresponding connector reflection pulse returned from the output connector, the method comprising the steps of establishing an initial calibration reflection pulse amplitude (A') by supplying light pulses to the reference reflector and storing such initial calibration reflection pulse amplitude in a memory of the processor; subsequently, during normal usage, supplying pulses to the reflector from the light source, determining the amplitude (A) of a reflection pulse resulting therefrom; comparing said amplitude of the resulting reflection pulse (A) with the stored initial calibration reflection pulse amplitude (A'); determining any differences ($\Delta_{OTDR}$) therebetween; and compensating for such differences during subsequent measurements by the apparatus.

8. A method of measuring insertion loss by means of an optical time domain reflectometer comprising a coupler having first, second, third and fourth ports, a light source and an optical detector connected to the first and second ports, respectively, and an output connector and a reference reflector connected to the third and fourth ports respectively, the output connector serving for connection to an optical fiber to be measured, the coupler being arranged to couple light from the light source to both the output connector and the reference reflector and to couple, light returning from the output connector and reference reflector to the optical detector, the optical path between the output connector and the coupler being longer than the optical path between the reference reflector and the coupler, such that a reference reflection pulse from the reference reflector produced by a pulse emitted by the light source will be received by the optical detector before a corresponding connector reflection pulse returned from the output connector, the method comprising the steps of:

during an initial calibration, establishing an initial calibration reflection pulse amplitude (A') by supplying light pulses to the reference reflector and storing, such initial calibration reflection pulse amplitude (A') in a memory of the processor; establishing an initial calibration launch level (C') by extrapolating to a zero ordinate a substantially linear tail portion of a backscatter trace obtained with a reference optical fiber connected to the output connector and storing the initial calibration launch level (C');

subsequently, during normal usage; supplying pulses from the light source to the reflector and determining the amplitude of a subsequent reflector pulse (A), and determining any difference ($\Delta_{OTDR}$) between the initial calibration reflection pulse amplitude (A') and the subsequent reflector pulse amplitude (A);

with a fiber-under-test connected to the output connector, supplying pulses from the light source, to produce a further backscatter trace;

extrapolating a substantially linear rail portion of said further backscatter trace for the fiber-under-test to the zero ordinate to establish a measured launch level (C);

establishing an expected launch level (C") as the initial calibration launch level (C') plus or minus, as appropriate, said difference ($\Delta_{OTDR}$) between the initial calibration reflection pulse amplitude (A') and the resulting reflection pulse amplitude (A); and determining the insertion loss as the difference between the expected launch level (C") and the measured launch level (C).

* * * * *